United States Patent
Fieseler et al.

(10) Patent No.: US 6,452,380 B1
(45) Date of Patent: Sep. 17, 2002

(54) ROD AND APPARATUS FOR CALIBRATING MAGNETIC ROLL TESTING APPARATUS

(75) Inventors: Wayne Gerard Fieseler, Versailles; Mark Duane Foster, Lexington; Robert Edward Hackett, Lexington; Calvin Dale Murphy, Lexington; James Edward Nichols, Lexington, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/535,673

(22) Filed: Mar. 23, 2000

(51) Int. Cl.[7] .............................................. G01R 35/00
(52) U.S. Cl. ...................................................... 324/202
(58) Field of Search ............... 324/202, 207.11–207.24, 324/260, 261, 262

(56) References Cited

U.S. PATENT DOCUMENTS

| | | |
|---|---|---|
| 3,097,598 A | 7/1963 | Hotop et al. |
| 3,714,692 A | 2/1973 | Bray |
| 3,745,626 A | 7/1973 | Bray |
| 4,638,281 A | 1/1987 | Baermann |
| 5,384,957 A | 1/1995 | Mohri et al. |
| 5,539,368 A | 7/1996 | Yamashita |
| 5,668,519 A | 9/1997 | Yamashita |

Primary Examiner—Jay Patidar
(74) Attorney, Agent, or Firm—John A. Brady

(57) ABSTRACT

A calibration rod (1) with grooved track (2) and a testing apparatus (17) for magnetic rolls that produces an accurate homing location and probe-to-probe reference for repeated test verification at many testing locations. The grooved track calibration rod can be transported to different equipment to verify that equipment is performing similarly, has improved accuracy, has temperature compensation, uses a circumferential drive movement from one end of a roll magnet and verifies angular position from the other end, eliminates the possibility of angular inaccuracy from twisting of the part being measured during clamping and provides for improved accuracy of several degrees. A high order polynomial curve fit of the data is used to determine the true value of the Gauss level being measured during 360 degree revolution. The apparatus takes measurements to accurately measure magnetic differences which define differences in probe operation. The value of other probes will be matched (multiplied by a percentage) to a first master reference probe. The apparatus eliminates twist, which can affect pole location accuracy by several degrees.

22 Claims, 3 Drawing Sheets

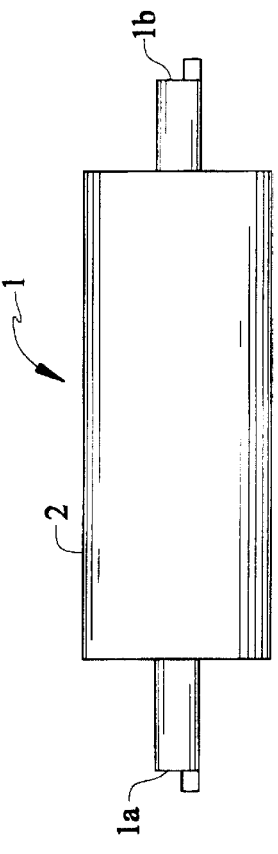
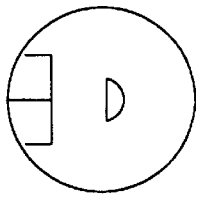
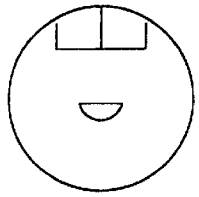
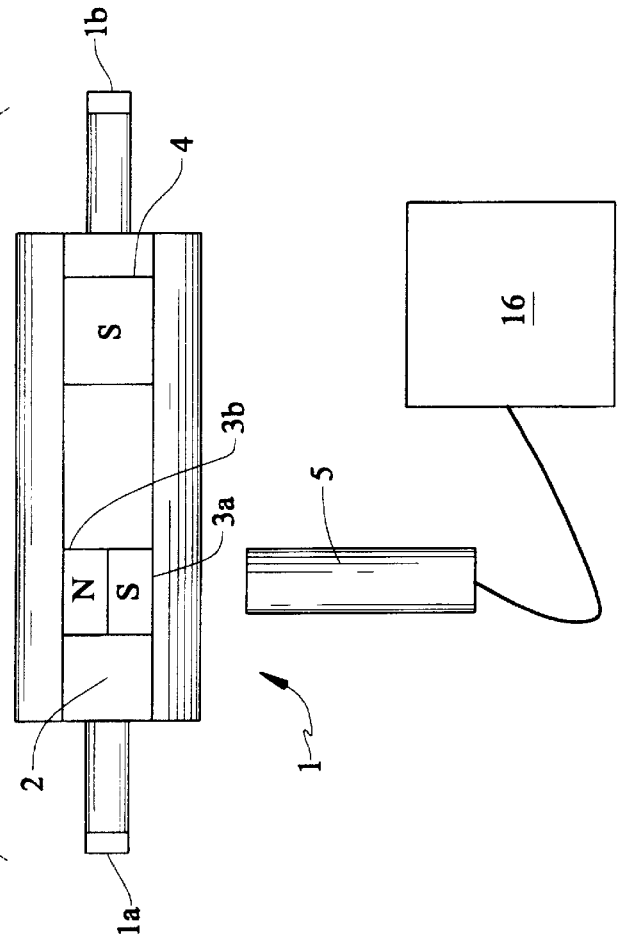
FIG. 1
FIG. 2
FIG. 3
FIG. 4

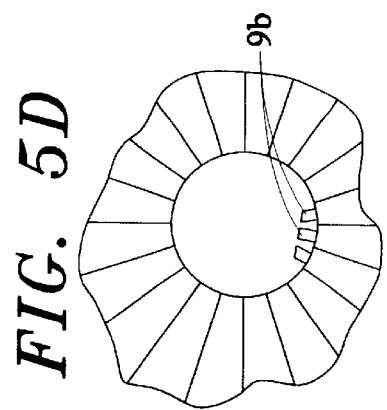
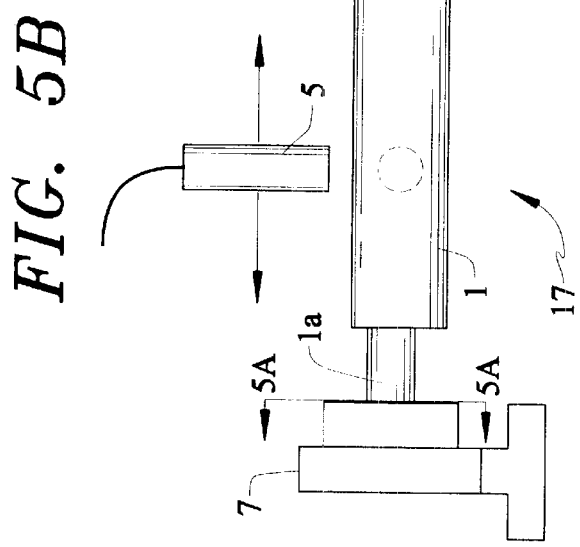
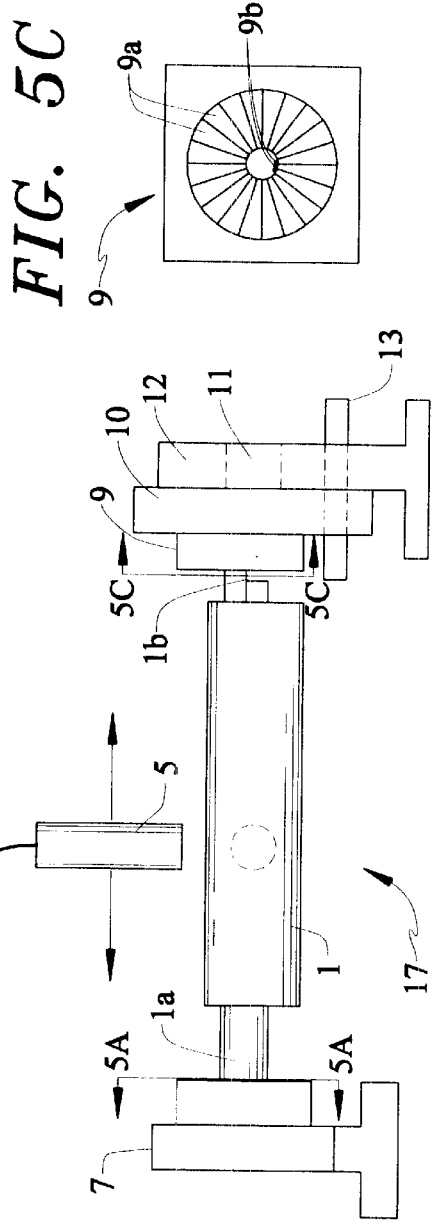
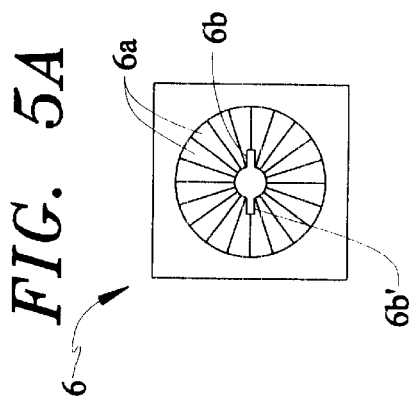

RADIAL
NORTH-SOUTH MAGNET PAIR

RADIAL
SINGLE MAGNET

ROD AND APPARATUS FOR CALIBRATING MAGNETIC ROLL TESTING APPARATUS

FIELD OF THE INVENTION

The present invention relates to a calibration rod and testing apparatus for magnetic rolls. More particularly, the present invention relates to a calibration rod and testing apparatus for magnetic rolls that produces an accurate homing location and probe-to-probe reference for repeated test verification at many testing locations. The grooved track calibration rod can be transported to different equipment to verify that equipment is performing similarly. The apparatus for testing magnetic rolls used in the printing, facsimile and copier industry, has improved accuracy, has temperature compensation, uses a circumferential drive movement from one end of a roll magnet and verifies angular position from the other end, eliminates the possibility of angular inaccuracy from twisting of the part being measured during clamping and provides for improved accuracy of several degrees. The calibration rod and testing apparatus for magnetic rolls utilizes a high order polynomial curve fit of the data to determine the true value of the Gauss level being measured during 360° revolution. The apparatus takes measurements to accurately measure magnetic differences rather than differences in probe variation. The value of other probes will be matched (multiplied by a percentage) to a first master reference probe. The apparatus eliminates twist, which can affect pole location accuracy by several degrees.

DESCRIPTION OF THE PRIOR ART

It is difficult to obtain accurate measurement of magnetic rolls between locations. The most common method of such measurement involves using a tangential probe circumferentially around a roll magnet, positioned at a distance substantially equal to the application distance and down the length (axially) at the same distance. Typical application distances are 8 mm, 10 mm, 12 mm, 16 mm, 20 mm, or 30 mm, where less than 0.0254 mm can cause variation in magnetic response data of 7 Gauss or so at a pole peak reading of 1000 Gauss.

Furthermore, if 100% homogeneous ferrite with nylon binder magnetic rolls are clamped in test fixtures with tension applied to both ends, the magnetic roll being tested can develop twist, which can affect pole location accuracy by several degrees.

In addition, variation in temperature of ferromagnetic materials typically causes a 1.8 Gauss change per degree Celsius (1 Gauss per degree Fahrenheit). As a result, temperature measurement is critical. The usual technique for making such measurements places a tangential probe on an aluminum sleeve disposed around the magnetic roll, and rotating the magnetic roll 360 degrees. The tangential probe is then moved axially, or down-the-length of the magnetic roll. Production samples are then taken throughout the day where ambient temperatures vary. Plant temperatures can vary from 7 degrees C. to 38 degrees C. (45 degree F. to 101 degrees F.).

Tangential probes have an internal element of unknown dimensional maximum sensitivity relative to a center point location and of unknown sensitivity in distance from the outer edge. For example, sensing elements are manufactured within a protective jacket, and the exact distance of the actual sensor to the edge is unknown. Therefore, accurate placement of the probe is unclear, and generally the probe is simply placed directly on the surface of a sleeve, resulting in under-reported field levels. In addition, accuracy when using a sleeve with end plugs independently, and coaxially mounted around a magnet, builds in inaccuracies due to circular run out of the sleeve. Furthermore, although motors used to drive a rotational or axial probe movement can have excellent accuracies of 1/100 of a degree, the homing accuracy (return to zero) and mechanical movement accuracy (lead screw) could easily involve ½ degree variation and vibration variation of 0.05 mm. Therefore, results from one test apparatus can have compounded variation, and results from test apparatuses at different locations can have even more sizable variation of up to 15% of a scale reading or approximately 150 Gauss.

SUMMARY OF THE INVENTION

The foregoing and other deficiencies of the prior art are addressed by the present invention which is directed to a calibration rod and testing apparatus for magnetic rolls.

This invention provides an apparatus for testing magnetic rolls used in the printing, facsimile and copier industry, having improved accuracy by employing a calibration rod and master probe data which are employed at separated testing apparatus to assure consistent testing results.

This invention also provides a calibration rod and testing apparatus for magnetic rolls having temperature compensation.

This invention further provides a calibration rod and testing apparatus for magnetic rolls which uses a circumferential drive movement from one end of a roll magnet and has a floating angular position at the other end.

This invention further provides a calibration rod and testing apparatus for magnetic rolls in which the existence of parting line flats on end shafts does not influence magnetic measurement.

This invention further provides a calibration rod and testing apparatus for magnetic rolls which eliminates the possibility of angular inaccuracy from twisting of is the part being measured during clamping and provides for improved accuracy of several degrees.

This invention further provides a calibration rod and testing apparatus for magnetic rolls utilizing a high order polynomial curve fit of the data to determine the true value of the Gauss level being measured during revolution.

This invention further provides a calibration rod and testing apparatus for magnetic rolls in which measurements taken of a production magnetic roll will accurately measure magnetic differences rather than differences in probe characteristics.

This invention further provides a calibration rod and testing apparatus for magnetic rolls in which the value of other probes will be matched (multiplied by a percentage) to a first master reference probe.

This invention further provides a calibration rod and testing apparatus for magnetic rolls which eliminates twist, which can affect pole location accuracy by several degrees.

BRIEF DESCRIPTION OF THE DRAWINGS

These and other attributes of the present invention will be described with respect to the following drawings in which:

FIG. 1 is a side view of the grooved track calibration rod of the present invention;

FIG. 2 is a left end view of the rod shown in FIG. 1;

FIG. 3 is a top view of the grooved track calibration rod shown in FIG. 1;

FIG. 4 is a right end view of the rod shown in FIG. 3;

FIGS. 5A–5C are a side view and outward looking end views, respectively of the grooved track calibration rod supported by a mounting mechanism of a test bed according to the present invention;

FIG. 5D is an enlargement of part of FIG. 5C; and

DETAILED DESCRIPTION OF THE INVENTION

Referring to FIGS. 1–4, a grooved track calibration rod 1 is shown. The grooved track calibration rod 1 in combination with the rotational and down-the-length test bed 17 (shown somewhat illustratively in FIG. 5B) probe 5 and a computer 16 (FIG. 3), produces an accurate homing location and probe-to-probe reference for repeated test verification at many testing locations. The grooved track calibration rod 1 can be transported to different equipment to verify that equipment is performing similarly.

Figure 6A:
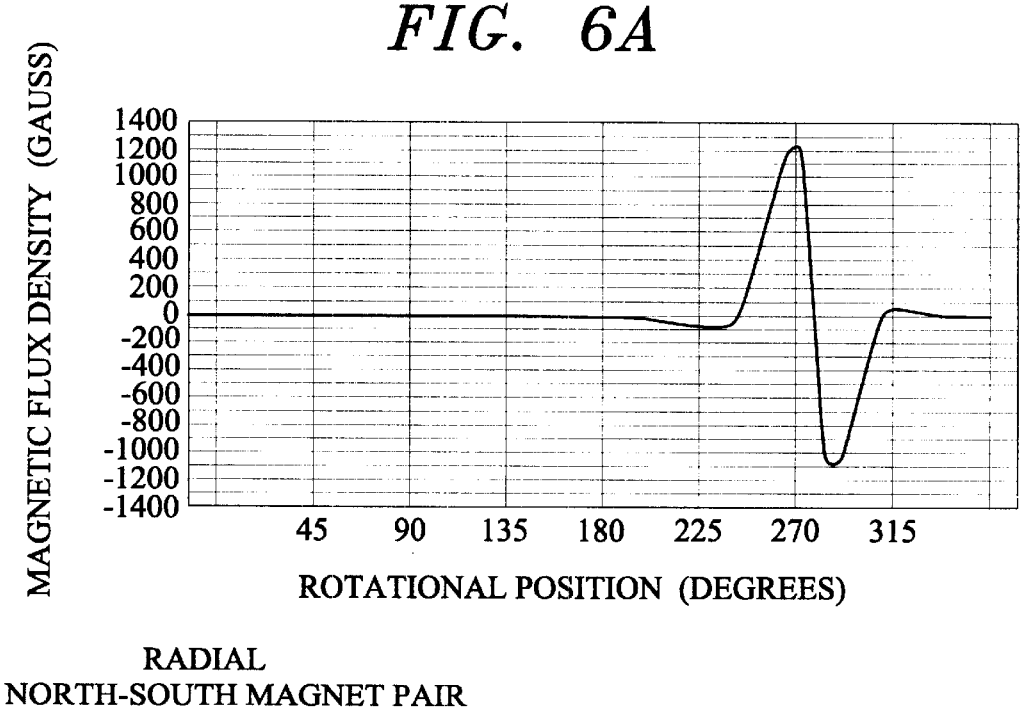
FIGS. 6a and 6b are wave diagrams of a radial north-south magnet pair and a radial single magnet, respectively.

The grooved track calibration rod 1 end shafts 1a and 1b are machined to match the end geometry of parts that will be manufactured in production, which typically is a D-shape or square and at the same time, one or more grooved tracks 2 are machined in the calibration rod. The machining is performed to an accuracy of 0.001775 mm. The grooved track 2 is then fitted with a pair of abutting high energy Rare Earth Magnets (REM) 3a and 3b such as samarium cobalt 217, neodymium boron or the like. The pair of high energy rare earth magnets 3a or 3b are of opposite polarity so that together the magnets 3a and 3b develop a alternating wave, shown in FIG. 6A having a zero Gauss point between the north and south poles. The zero Gauss point exists with an extremely sharp, almost linear and near vertical slope. The mechanical test bed 17 rotate north-south pair of magnets 3a and 3b toward the measuring probe 5 beginning at a predetermined nominal angle, typically 0 degrees, 90 degrees, 180 degrees or 270 degrees. The computer 16 and a Gauss meter (not shown) drive a stepper motor 7 successively in 1/100 degree increments until an exact zero point is estimated.

The forgoing steps are an iterative process which uses different rotational homing resolutions (step sizes) and finds the zero point. The position of the zero point is stored in memory of the computer 16 as the reference home location for further testing.

An additional feature of the grooved track calibration rod 1 is that, since any coupler associated with a motor drive to rotational device can involve mechanical memory or angular variation, a computer program can allow for any offset with resolutions to 1/100 degree. Such an offset feature allows starting of the test at a predetermined location which will obtain any expected waveform pattern. For example, starting at 90.01 degrees. A special provision of the test apparatus is to always rotate the magnet being tested in one direction to avoid possible "back lash error".

Figure 6B:
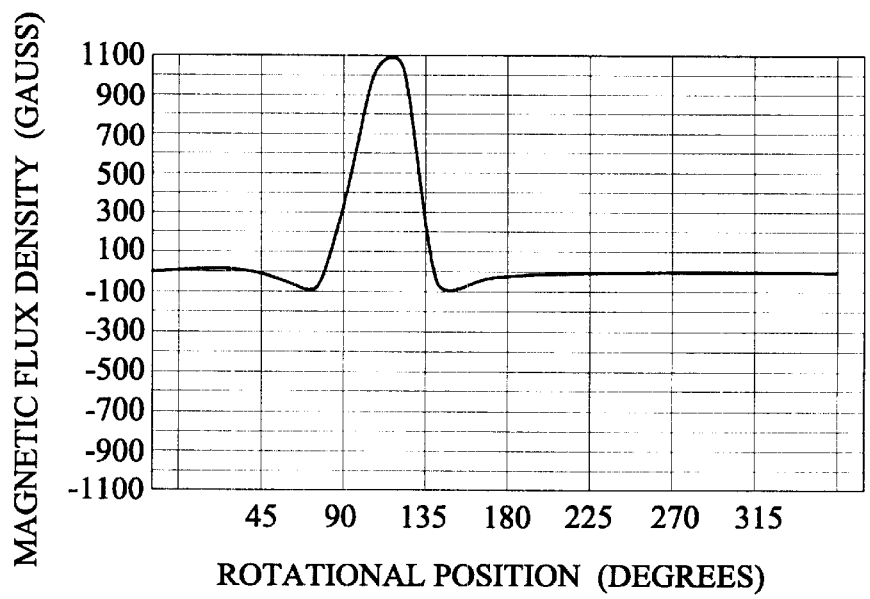

The grooved track calibration rod 1 is also fitted with a single magnet 4 which is magnetized to approximately 1000 Gauss. The magnet 4 is placed within one of the grooved tracks 2 and slid locations to be observed by probe 5. A typical response is shown in FIG. 6b. Software is employed to read and store the magnetic output value and then magnet 4 is successively slid to other probe positions and the magnetism is measured and stored. A significant feature of the present invention is that, within the software, the value of all other probes at various locations is matched (multiplied by a percentage) to data initially found by computer 16 at a master reference location. Calibration rod 1 is sent to all manufacturing locations to verify probe operation. As a result, any measurements taken of a production magnetic roll will accurately measure magnetic differences rather than differences in probe characteristics. Matching each additional probe to a probe at a master location using a positive or negative percentage, rather than adding or subtracting a specific offset value, provides the proper response when measuring typical sinusoidal wave forms that pass through zero.

Another feature of the present invention is the use of a high order polynomial curve fit of the data to determine the true value of the Gauss level being measured during 360 degree revolution. For example, if readings were taken every 5 degrees, 1 degree, or 0.5 degree, the true location of the maximum or pole location may be missed. A 10th order polynomial fitting a linear, near vertical curve is employed to accurately estimate the true magnetic angle at zero Gauss without actually measuring at the interval of accuracy. As a result, very accurate readings to 1/10th of a degree are produced, and also the measurement process is accelerated by avoiding measurements at very small degree intervals. The high order curve fit accurately and easily predicts pole wave forms that are both sinusoidal and/or non-sinusoidal. Other forms of numerical analysis are alternatives, such as the widely used least squares method and, depending on the accuracy sought, linear interpolation.

Another aspect of the calibration rod 1 and testing apparatus 17 for magnetic rolls of the present invention is the use of a circumferential drive movement from one end of a roll magnet and floating of angular position from the other end. The mounting mechanism uniformly tightens around one end shaft 1a using a modified standard lathe collet 6.

Collet 6 has a circle of spaced fingers 6a which are forced together by turning an outer member, which is standard. Collet 6 is mounted on stepper motor 7. Collet 6 is modified by adding two opposing slots, 6b and 6b', each about 1/10 of the circumference of the circle of fingers 6a. The slots permit better centering of shaft 1a. Additionally, after initial tightening, it is important to relax the tightening and then tighten again with moderate force.

The other end of testing apparatus 17 is collet 9 mounted on a free floating bearing support 10 which is vertically supported but free to rotate. Floating support 10 has a horizontal extension 11 (shown in broken lines) which rotates in a bearing in laterally movable frame 12.

Collet 9 has a circle of spaced fingers 9a which are closed in the manner of collet 6. Collet 9 is modified from a standard collet by having extensions 9b (best seen in FIG. 5D), which form a flat plane to accommodate specific magnetic roll positional end shaft configurations such as D's, flats or squares. Collet 9 with extensions 9b is designed to fit the end shaft 1b when fingers 9a are closed. Extending through holes in free floating bearing support 10 and frame 12 is a rod 13. Rod 13 is removed after rod 1 is mounted in collet 6 and collet 9. Since floating support 10 is free to rotate, if the part being tested has an internal twist, the part will move from the home position when the pin or rod 13 is removed. As a result, the foregoing arrangement eliminates the possibility of angular inaccuracy from twisting of the part during clamping and accounts for improved accuracy of several degrees. The foregoing mounting arrangement also eliminates another source of variation in measured field response levels by correcting for the parting flats along the end shafts, which are typically 0.15 mm and 180 degrees apart. With the apparatus of the present invention, the existence of parting line flats does not influence magnetic measurement. Other mounting devices which present a matched surface to the flats and which close down on that surface such as by leaf springs are, of course, alternative, to collet 9.

The calibration rod and testing apparatus for magnetic rolls of the present invention also provides temperature compensation of data. For every measurement taken, the value is adjusted by a percentage to report the true value relative to the ambient temperature of 21 degrees C. (70 degrees F.). Based on the ferrite composition of the material under test, which is typically strontium ferrite, the appropriate correction is reported. With a correction factor of approximately 1.8 Gauss/C. (1 Gauss/degree F.), there is less variation in measurements from location to location. Having described several embodiments of the calibration rod and testing apparatus for magnetic rolls, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A calibration rod and testing apparatus for magnetic rolls comprising:
   a calibration rod having a grooved track down its length, said calibration rod having a north-south magnetic pair mounted on its periphery and at least a single magnet mounted in said track for movement to different longitudinal positions on said calibration rod;
   a rotational and down-the-length test bed;
   a probe; and
   a computer, said apparatus determining an accurate homing location by sensing said magnetic pair and determining reference values by sensing said single magnet, said homing location and said reference values being for repeated use for calibration at other testing locations using said calibration rod at said other testing locations.

2. A calibration rod and testing apparatus for magnetic rolls as recited in claim 1, wherein said calibration rod has end shafts which match end shaft geometry of parts that will be manufactured in production.

3. A calibration rod and testing apparatus for magnetic rolls as recited in claim 2, wherein said apparatus uses a circumferential drive movement from one end of a roll magnet and a free flowing bearing support on the opposite end of said roll magnet.

4. A calibration rod and testing apparatus for magnetic rolls as recited in claim 3, wherein said test bed comprises a mounting mechanism which tightens uniformly around an end shaft of said magnet roll having a flat surface.

5. A calibration rod and testing apparatus for magnetic rolls as recited in claim 4, wherein said tightening mechanism comprises the fingers of a collet.

6. A calibration rod and testing apparatus for magnetic rolls as recited in claim 3, wherein said free floating bearing support comprises individually designed receptors for accommodating specific magnetic roll positional end shaft configurations.

7. A calibration rod and testing apparatus for magnetic rolls as recited in claim 6, further comprising a pin disposed perpendicular to said free floating bearing support, so that if a part being tested has an internal twist, said part will move from a home position when said pin is removed.

8. The calibration rod and testing apparatus of claim 6, wherein said test bed comprises a mounting mechanism which tightens around an end shaft of said magnet roll having a flat surface.

9. The calibration rod and testing apparatus of claim 8, wherein said tightening mechanism comprises the fingers of a collet.

10. A calibration rod and testing apparatus for magnetic rolls as recited in claim 1, in which said magnetic pair is two high energy rare earth magnets disposed in said grooved track.

11. A calibration rod and testing apparatus for magnetic rolls as recited in claim 10, wherein said pair of high energy rare earth magnets are of opposite polarity and develop a wave having a zero Gauss point between north and south poles.

12. A calibration rod and testing apparatus for magnetic rolls as recited in claim 11, wherein said test bed rotates the said pair of high energy rare earth magnets toward said probe at a predetermined nominal angle.

13. A calibration rod and testing apparatus for magnetic rolls as recited in claim 11, wherein said single magnet is magnetized to approximately 1000 Gauss.

14. A calibration rod and testing apparatus for magnetic rolls as recited in claim 13, wherein said magnetism of said single magnet is read and stored in said computer for various longitudinal probe positions.

15. A calibration rod and testing apparatus for magnetic rolls as recited in claim 14, wherein said computer further stores values of said probe to be used as reference values when said calibration rod is used with a different probe and test bed, so that measurements taken of a production magnetic roll will accurately measure magnetic differences rather than differences in probe variation.

16. A calibration rod and testing apparatus for magnetic rolls as recited in claim 1, wherein said apparatus drives a stepper motor successively in $\frac{1}{100}$ degree increments until a position of a zero point is found.

17. A calibration rod and testing apparatus for magnetic rolls as recited in claim 16, wherein said position of said zero point is stored in a memory of said computer as a reference home location for further testing.

18. A calibration rod and testing apparatus for magnetic rolls as recited in claim 16, wherein said computer allows for offset with resolutions up to $\frac{1}{100}$ degree.

19. A calibration rod and testing apparatus for magnetic rolls as recited in claim 18, wherein said test bed rotates a magnet tested in only one direction to avoid back lash error.

20. A calibration rod and testing apparatus for magnetic rolls as recited in claim 1, wherein said computer employs numerical analysis to estimate a true zero Gauss level location being measured during revolution.

21. A calibration rod and testing apparatus for magnetic rolls as recited in claim 1, wherein said computer compensates for temperature variation so that magnetic values are adjusted by a percentage to report a true value relative to an ambient temperature of 21 degrees C.

22. A calibration rod and testing apparatus for magnetic rolls as recited in claim 21, wherein, when material under test is based on a ferrite composition a correction factor of approximately 1.8 Gauss/C. is employed.

* * * * *